April 1, 1969

C. P. WARMAN 3,435,936

HEAT DISSIPATING CLUTCH OR BRAKE WITH A PERIPHERALLY
PIVOTED PLANAR WEAR PLATE FOR EXPANSIVE
MOVEMENT IN A COEXTENSIVE PLANE

Filed May 6, 1966

INVENTOR.
CHARLES P. WARMAN

BY

Wayland D. Keith

HIS AGENT

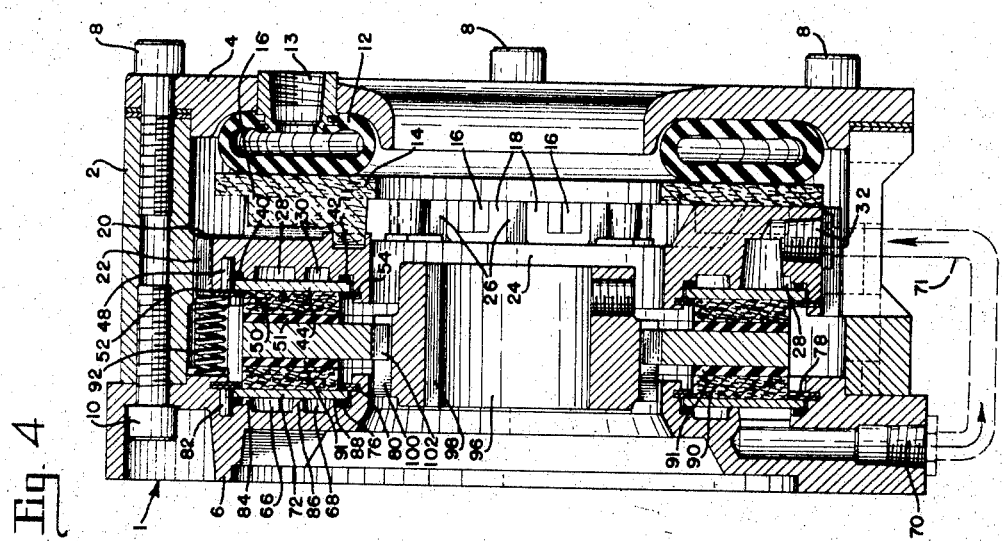

April 1, 1969
C. P. WARMAN
3,435,936
HEAT DISSIPATING CLUTCH OR BRAKE WITH A PERIPHERALLY
PIVOTED PLANAR WEAR PLATE FOR EXPANSIVE
MOVEMENT IN A COEXTENSIVE PLANE
Filed May 6, 1966
Sheet 3 of 4
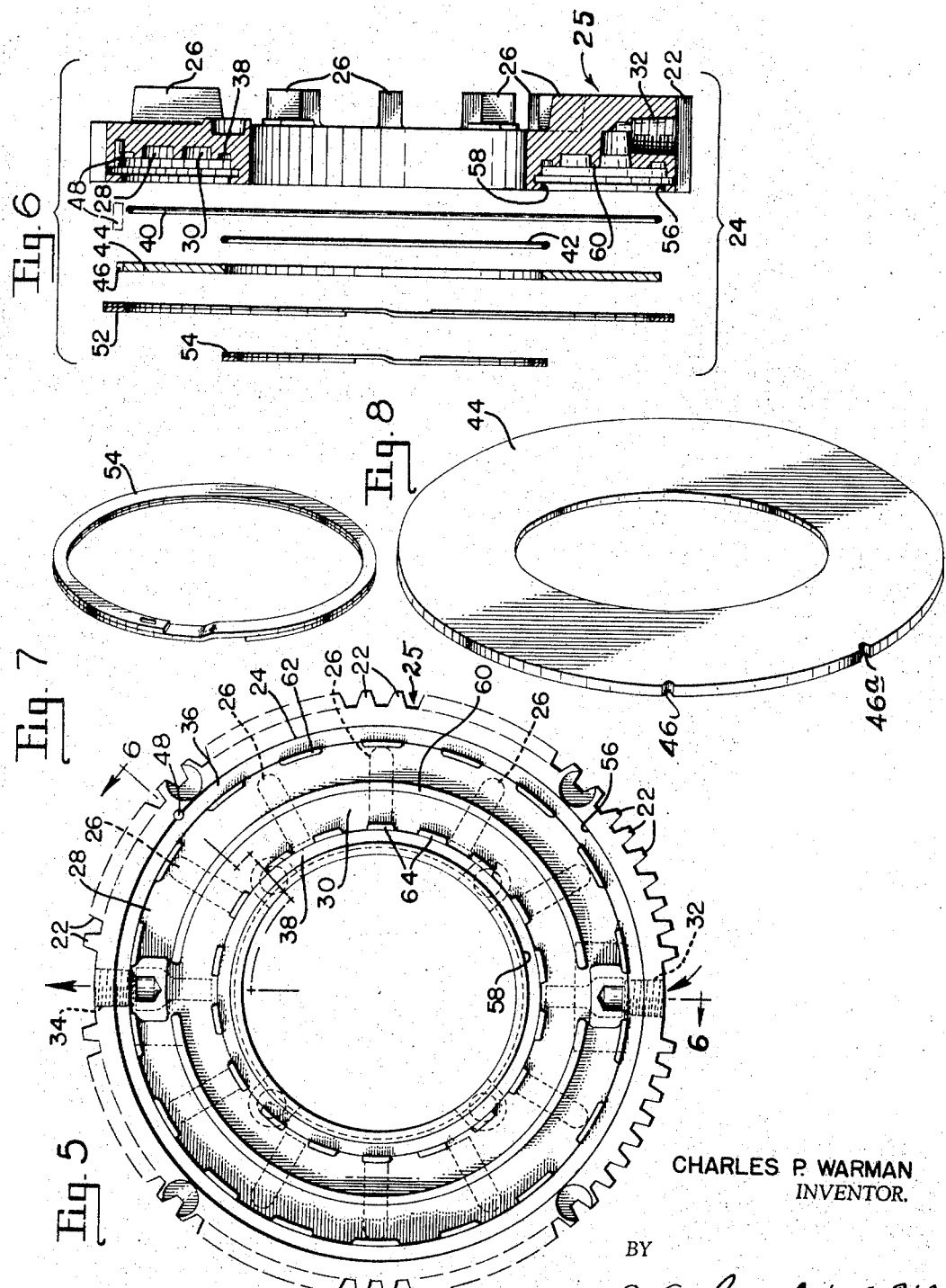
CHARLES P. WARMAN
INVENTOR.
BY
Wayland D Keith
HIS AGENT

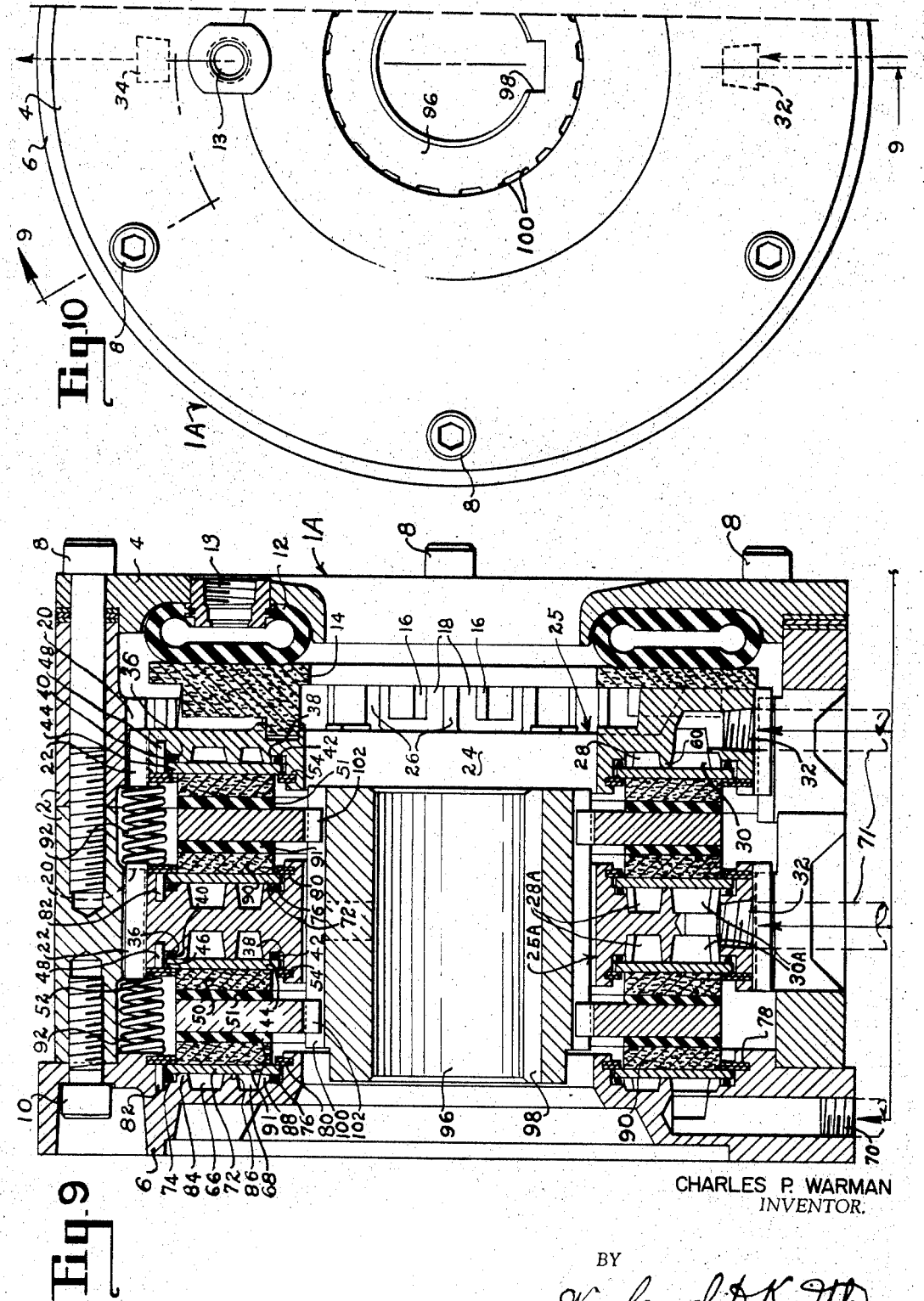

United States Patent Office 3,435,936
Patented Apr. 1, 1969

3,435,936
HEAT DISSIPATING CLUTCH OR BRAKE WITH A PERIPHERALLY PIVOTED PLANAR WEAR PLATE FOR EXPANSIVE MOVEMENT IN A COEXTENSIVE PLANE
Charles P. Warman, Wichita Falls, Tex., assignor to Wichita Clutch Company, Inc., Wichita Falls, Tex.
Filed May 6, 1966, Ser. No. 556,793
Int. Cl. F16d 13/60, 13/72, 13/74
U.S. Cl. 192—113       11 Claims

ABSTRACT OF THE DISCLOSURE

A friction clutch or brake for rapidly dissipating heat by circulating a cooling media therethrough to maintain the friction elements, both the metal wear plates and the asbestos friction discs, at a temperature below that at which damage thereto would be effected, which arrangement increases the frictional coefficient of the friction elements. The present clutch or brake utilizes a wear plate of metal, such as copper, of high heat conductivity to rapidly dissipate the heat caused by interengaging of the friction elements. Provision is made for a planar expansion to prevent distortion so as to permit continuous slipping of the clutch or brake over an indefinite period of time without appreciative wear.

---

This invention relates to improvements in clutches and brakes and more particularly to the dissipation of heat incident to the clutching or braking action between the friction elements within the clutch or brake mechanism.

Various clutches and brakes have been proposed heretofore with heat dissipation elements associated therewith such as radiation fins, liquid circulation media, and even liquid circulation media in combination with friction elements, at least one of which is a copper plate.

The present device, as embodied in the invention, utilizes a copper plate as one of the friction elements, which copper element is in contact radiation relation with a cooling media, such as liquid being circulated thereagainst to readily transfer the heat thereto, so as to minimize the wear on the complementary frictional elements. The present arrangement also gives a greater frictional coefficient to enable the clutch or brake to be applied smoothly and positively without grabbing.

The particular inventive contribution of the present device to the art resides particularly in the manner of installing the copper plate within the clutch or brake in such manner as to minimize or prevent distortion, to enable the plate to be readily installed and removed in a minimum of time, yet, provide a positive seal so that the plate of the clutch or brake will not normally leak liquid from the passage whereby the liquid is circulated thereagainst. Further, the present invention utilizes non-rigid mounting of the clucth or brake plate in such manner that expansion may take place in any direction without distortion of the plate; yet, the plate is fixedly held against relative rotation with respect to the housing which contains the passage for the liquid, which liquid is being circulated against the plate. Furthermore, the clutch or brake plates are held in place by "clip rings" in such manner as to enable a limited shifting movement of the clutch plate or the brake plate about a peripheral anchor point or points, and which clip rings will enable ready removal and replacement of the plates.

In certain clutches which use removable plates, particularly copper plates which are most suitable for friction plates in liquid cooled clutches or brakes due to their high conductivity of heat, such plates are readily distorted if rigidly and positively secured at uniformly spaced apart peripheral points and also around the inner diameter; yet, metallic clutch or brake plates secured in this manner, particularly copper plates, which have a high coefficient of expansion, will distort or warp, so that the effective engagement of the complementary friction members is such that the full plane face of the clutch plate or disc is not in uniform contact with the plane face of the complementary friction member; therefore, the effectiveness of the operation of the clutch or brake is greatly reduced thereby nullifying many of the benefits derived from use of a copper plate as a clutch element or as a brake element.

An object of this invention is to provide a clutch or brake, with a plate of high heat conductivity, which plate may be readily attached to and removed from a clutch or brake body in a minimum of time.

Another object of the invention is to provide a metallic friction plate of high heat conductivity which is fitted within a clutch or brake body, which body has cooling media channels formed therethrough so that a liquid cooling media may be circulated to be in contact relation with the metallic friction plate, but will be in sealed relation within said clutch body.

Another object of the invention is to provide a metallic friction plate of high heat conductivity which is fitted within a clutch or brake body, which body has cooling media channels formed therethrough so that a liquid cooling media may be circulated in contact relation with the metallic friction plate, and to be in sealed relation within the body by O-ring sealing elements within the clutch or brake body.

Still another object of the invention is to provide a metallic disc or plate friction element for a clutch or brake, which metallic disc or plate friction element is adapted to fit within a clutch or brake body, and which friction element is movably anchored on the periphery thereof at a single point to enable expansion and contraction within the same plate without distortion of the metallic disc or plate friction element.

Still another object of the invention is to provide a metallic disc or plate friction element for a clutch or brake, which metallic disc or plate is adapted to fit within a clutch or brake body that is movably anchored at no more than two points on the periphery thereof to enable expansion and contraction within the same plane without distortion thereof.

A further object of the invention is to provide a liquid cooled clutch or brake having liquid passages formed within the body thereof, which passages are closed in sealed relation by a planar friction clutch or brake member which is retained in place, for limited movement, by clip rings which engage in the body of the clutch or brake and with the planar frictional clutch or brake member.

A still further object of the invention is to provide a clutch or brake friction plate member which is smaller in diameter than the recess in which it fits, and which has a notch formed in the periphery thereof to complementally engage an anchor pin which is fitted within the clutch or broke body so that the metallic friction plate is free to expand in all directions; yet, it is fixedly held against relative rotation with respect to the clutch or brake body.

Another object of the invention is to provide a clutch or brake plate which is simple in construction, easy to remove and replace, low in the cost of manufacture, and which is effective in operation.

With these objects in mind and others which will become manifast as the description proceeds, reference is to be had to the accompanying drawings in which like reference characters designate like parts in the several views thereof, in which:

FIG. 3 is an end elevational view of the clutch or brake which embodies the invention;

FIG. 4 is a sectional view taken on line 4—4 of FIG. 3, looking in the direction indicated by the arrows;

FIG. 5 is an elevational view of a clutch or brake body component showing the clutch or brake plate receiving recess, the cooling fluid passages, with a portion of the body having teeth thereon being shown in dashed outline, for simplicity in representing the addendum and dedendum of the clutch teeth;

FIG. 6 is an exploded sectional view taken on line 6—6 of FIG. 5, of a portion of the clutch or brake body, but showing the O-ring sealing elements, the clutch or brake plate friction disc or element; and the clip rings for holding the clutch or brake disc in contact, sealing relation with the O-ring sealing elements within the clutch or brake body;

FIG. 7 is a perspective view of one of the clip rings shown apart from the clutch or brake body;

Figures 1, 2:
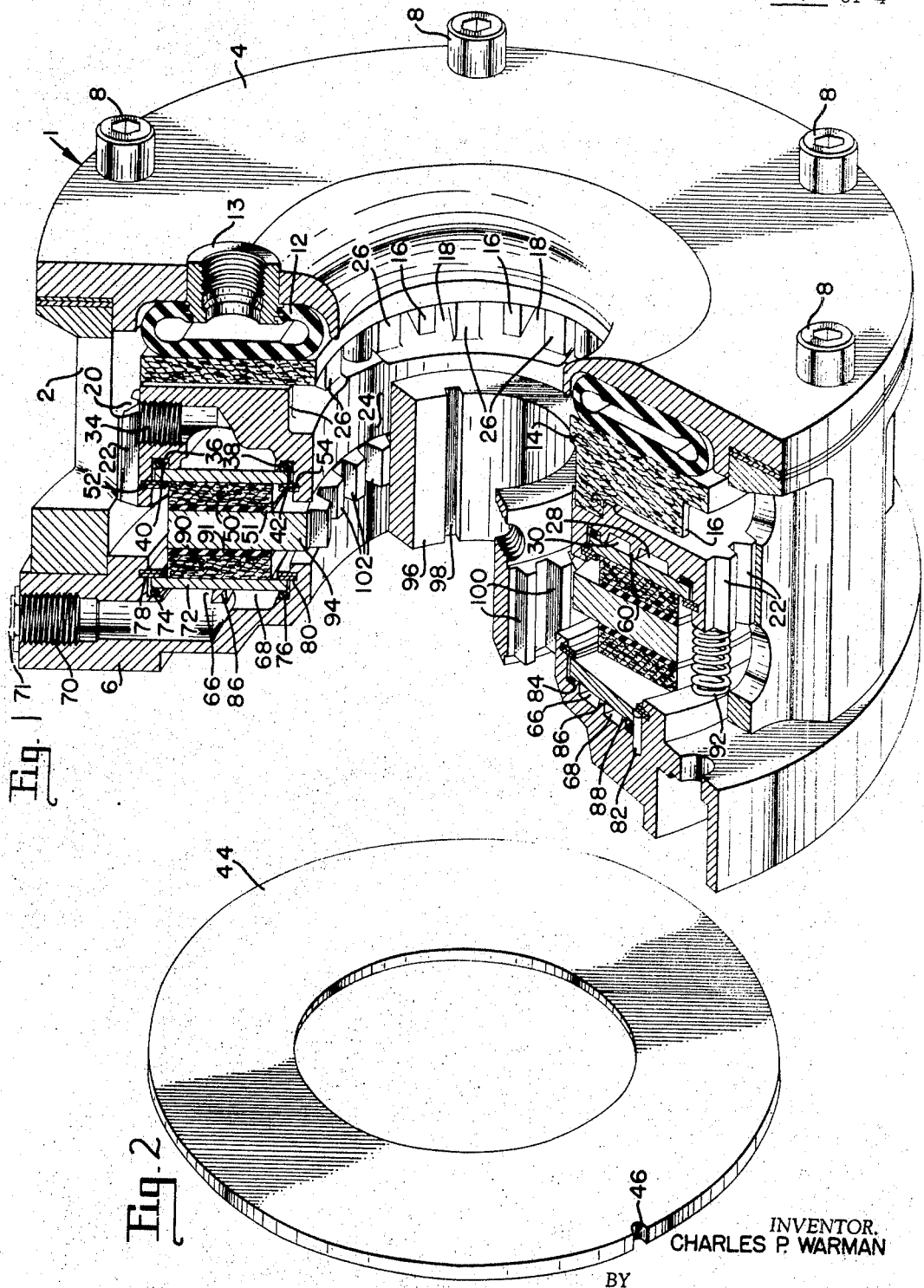
FIG. 1 is a perspective view of a clutch or brake element of the axially expansible type with, portions thereof being cut away and shown in section to bring out the details of construction.
FIG. 2 is a perspective view of a clutch or brake plate shown apart from the clutch or brake body, a notch is shown as formed in the periphery thereof.

FIG. 8 is a perspective view of a modified form of a clutch or brake frictional plate or disc element having two notches formed in the periphery thereof to complementally engage two dowel pins, or the like, within the clutch or brake body; with the form of the invention as shown above which utilizes a single dowel pin interengaging a single notch in the periphery of the clutch or brake frictional plate or element;

FIG. 9 is a cross sectional view taken on line 9—9 of FIG. 10, of a form of the invention using a plurality of clutch or brake wear plates; and FIG. 10 is a fragmentary, elevational view of a clutch or brake body similar to that shown in FIG. 3, but of the form of the invention utilizing a plurality of clutch or brake wear plates.

With more detailed reference to the drawings, the numeral 1 designates generally a clutch or brake assembly, which has a cylindrical casing or ring 2, with end members 4 and 6, one on each end of the cylindrical casing or ring 2. Bolts 8 and 10 secure the respective end members in binding engagement with the cylindrical casing or ring 2. An axially, expansible, elastomer, annular tube 12 is mounted within the cylindrical casing or ring 2 adjacent the end member 4, which tube is adapted to receive a fluid thereinto, such as air under pressure, to move a pressure plate 14 axially of cylindrical casing or ring 2, upon the application of air pressure through air connection 13 into the axially expansible elastomer annular tube 12. The end member 4 serves as a back-up plate for the axially, expansible, elastomer, annular tube 12 when air pressure is applied thereto. The pressure plate 14 is preferably made of asbestos or other heat resisting, insulating material and has ribs 16 thereon which form radial passages 18 to permit the air to pass through pressure plate 14 to dissipate the heat which is generated within the clutch or brake assembly 1.

The cylindrical casing or ring 2 has internally formed teeth 20 therein, which teeth complementally engage teeth 22 formed on the floating plate assembly 24, as will best be seen in FIG. 4 and in exploded view FIG. 6. The floating plate assembly 24 will best be seen in FIGS. 1, 4, and 6, and has ribs 26 on one side to complementally engage the ribs 16 on pressure plate 14. The inner face of the floating plate assembly 24 has grooved passages 28 and 30 formed therein, to form a distribution system through which to circulate cooling fluid from inlet opening 32 to an outlet opening 34. Grooves 36 and 38 are formed within the body 25 of the floating plate assembly 24 with the groove 36 surrounding grooved passage 28 within the body 25, and the groove 38 is spaced inward from the grooved passage 30. The grooves 36 and 38 have the respective O-rings 40 and 42, fitted therein, which form a seal with body 25, with a clutch or brake wear plate 44 fitted thereagainst.

The clutch or brake wear plate 44, as will best be seen in FIG. 2, has a notch, as indicated at 46, formed on the periphery thereof, which notch, in the present instance, complementally engages a dowel pin 48 in the body 25, in such manner, as to allow limited shifting movement of clutch or brake wear plate 44 about the dowel pin to permit expansion and contraction of the clutch or brake wear plate due to the transfer of heat from circumferentially spaced, segmental, asbestos friction disc 50 which is bonded by an elastomer bonding material 51 to one side of friction drive plate 94. It is preferable to have a plurality of these circumferentially spaced, segmental, asbestos friction discs 50 so that each segmental portion will be yieldably and resiliently mounted to enable true conformity between the adjacent plane face of the circumferentially spaced, segmental, asbestos friction disc 50 and the complementary face of clutch or brake wear plate 44. This insures even distribution of friction on all segments of circumferentially spaced, segmental, asbestos friction disc 50 and upon the planar face of the clutch or brake wear plate 44.

The clutch or brake wear plate 44 is retained in sealing relation against O-ring 40 and O-ring 42 by retainer ring 52 and retainer ring 54, which maintain the clutch or brake wear plate 44 within the confines of shoulders 56 and 58 of body 25. A circular ridge 60 on body 25 is positioned intermediate shoulders 56 and 58 and forms a medial circular support for clutch or brake wear plate 44. The respective grooves 36 and 38 have circumferentially spaced lugs 62 and 64 therearound so as to support the O-ring 40 and 42 in such manner that the cooling fluid being circulated therethrough is in contact relation with the arcuate surface of the respective O-rings to exert fluid pressure thereon, thereby insuring a seal between the O-rings, the body 25, and the clutch or brake wear plate 44. The end member 6 has similar groove passages 66 and 68 formed therein, to permit a cooling fluid, such as water or other cooling fluid, to be passed through inlet opening 70 and circulated through the grooved passages 66 and 68, and thence, through an interconnecting hose 71, into inlet opening 32 and out through outlet opening 34 so as to maintain the clutch or brake wear plate 44 and the clutch or brake wear plate 72 at normal operating temperature.

The clutch or brake wear plate 72 is substantially identical with the clutch or brake wear plate 44, as shown in FIGS. 2 and 8, and is sealed by means of O-rings 74 and 76 to maintain the cooling fluid within grooved passages 66 and 68. The clutch or brake wear plate 72 is maintained within a shouldered recess in end member 6 by retainer rings 78 and 80, which allows limited pivotal movement of clutch or brake wear plate 72 within end member 6. The clutch or brake wear plate 72 is free to expand within the plane defined by retainer rings 78 and 80 and the faces of ribs 84, 86 and 88, which ribs support the clutch or brake wear plate, yet permit free pivotal movement about dowel pin 82 within tolerance limits.

A friction member, such as a circumferentially spaced, segmental, asbestos friction disc 90, is bonded by an elastomer bonding material 91 to friction drive plate in a manner similar to the bonding of circumferentially spaced, segmental, asbestos friction disc 50 by the elastomer bonding material 51, functions in the same manner as above described, and is in cooperative friction relation with clutch or brake wear plate 72, with the axially expansible elastomer annual tube 12 moving pressure plate 14, floating plate assembly 24 against circumferentially spaced, segmental, asbestos friction disc 50 to compress springs 92, which will bring the friction drive plate 94, having circumferentially spaced, segmental, asbestos friction discs 50 and 90 thereon, into frictional engagement with clutch or brake wear plates 44 and 72 with the torque being transmitted through shaft hub 96, through keyway 98 and teeth 100 to the internal teeth 102 on friction drive plate 94.

The invention as disclosed in FIGS. 9 and 10 contains all the mechanical elements as disclosed in the clutch or brake as shown in FIGS. 1 through 8.

Like parts in the clutch or brake, as shown in FIGS. 9 and 10 are designated by the same numerals as shown in FIGS. 1 through 8, however, the form of clutch or brake, as shown in FIGS. 9 and 10, has a longer shaft hub 96 which has peripheral teeth 100 formed thereon to interengage with internal teeth 102 which are formed on the friction drive plates 94. Each friction drive plate 94 has segmental friction elements 50 and 90 bonded thereto by bonding material as designated at 51 and 91.

Annular fluid passages 28 and 30 are formed in body portion 25, with an inlet opening 32 connected with one side of the body and in communication with the inlet passages, and an outlet opening 34 is formed in the body and connects with the passages 28 and 30 at the opposite side from the inlet opening 32. An inlet passage 32A connects with passages 28A and 30A formed within inner body 25A which is positioned between friction drive plates 94. The inner body 25A has retainer rings 52 thereon to retain the wear plates 44 thereon in the manner as set out for the above mentioned form of the invention. The body 25A has teeth 22 formed on the periphery thereof. O-rings 40 are provided between the body 25A and the wear plates 44 to prevent leakage of fluid from the annular passages 28 and 30.

The body 25A has pivot pins 48 therein to fit within the peripheral notches in wear plates 44. An outlet passage, similar to the passage 34, connects with the annular grooves 28 and 30 on the side of the body opposite passage 32A in the manner shown in FIG. 10, so as to permit free passage of fluid therethrough. It is to be pointed out that, by having fluid passages in bodies 25 and 25A as well as in end plate 6, greater heat radiation is had. The parts which are numbered but not described for FIGS. 9 and 10, are described in the aforementioned portion of the specification.

Each side of the body 25A is grooved in a manner as best illustrated in FIG. 9.

*Operation*

The wear plates 44 and 72 are preferably made of copper, or of other construction of high heat conductivity, which plates are planar, and each is smaller in diameter than the particularly circular recess in which the respective wear plates are fitted.

In the form of the invention which utilizes wear plates, such as shown in FIG. 2, a single notch 46 is formed in the periphery of each wear plate, each which notch engages an abutment, such as the respective round dowel pins 48 and 82, which maintain the respective wear plates against relative rotational movement with respect to body 25 or end member 6, However, sufficient looseness is present to enable expansion and contraction of the wear plates 44 and 72, and also to permit pivotal movement of the respective plates 44 and 72 about pivot pins 48 and 82, each of which pivot pins forms an abutment, so, when the respective plates are retained in place by retainer rings 52 and 80 respectively, the O-ring sealing elements 40–42 between body 25 and plate 44 in compressed, sealed relation. The O-ring sealing elements 74–76 are fitted between end plate 6 and wear plate 72 in compressed, sealed relation. Upon inserting the respective retainer rings 52–54 and 78–80, and upon torque being applied through the shaft hub 84 when the brake or clutch is in engaged relation, will cause a shifting of the respective clutch or brake wear plates about their respective abutments. The respective abutments serve as locking members to develop a compressive force which will move the respective wear plates to the opposite side of the respective circular recesses to create sufficient frictional force on the periphery of the respective wear plates to keep the respective wear plates from rotating when the friction elements on drive plate 94 is bought into contact relation with the wear plates 44 and 72.

By having the wear plates in cooperative relation with the respective grooved passages for circulating a cooling media, such as a liquid, therethrough, heat will be readily dissipated, however, if the wear plates 44 and 72 were rigidly secured against shifting in a plane, distortion would occur, which would break the fluid seal of the O-rings with the wear plates in the respective bodies, and leakage of cooling fluid would occur.

It is preferable to have the friction elements 50 and 90 in segments of 60 degrees or less in arcuate length, as these will readily conform to the plane surface of the respective wear plate 44 and 72, upon application of pressure by elastomer tube 12. The coolant may either be circulated in parallel or in series through grooved passages in the clutch body 25 and in end member 6, however, FIG. 4 represents a series arrangement of circulation, FIGS. 9 and 10 represent a parallel arrangement of circulation through the brake or clutch.

While it is preferable for smaller size clutches to use wear plates with a single notch 46, for discs or wear plates of larger size it is preferable to have no more than two peripheral notches, such as 46 and 46a, spaced not more than 45 degrees apart, with the pins engaging the respective notches being so spaced and of such looseness, that each of the pins will be in contact with a face of the respective notches, when the friction drive plate 94 is in friction driving relation so as to cause a pivotal action of each plate about the respective abutments, so as to move the discs or wear plates against the opposite side of the respective circular recess, which develops a compressive force to impinge the wear plates in such manner as to keep the plate from rotating when the friction drive plate comes into contact with the wear plates.

While the invention has been shown and described in some detail, it is to be understood that changes may be made in construction thereof and adaptations made to different installations, without departing from the spirit of the invention or the scope of the appended claims.

Having thus clearly shown and described the invention, what is claimed as new and desired to be secured by Letters Patent is:

1. In a clutch or brake, the combination of driving and driven members severally comprising;
   (a) a housing including a cylindrical casing,
       (1) said cylindrical casing having teeth formed on the inner diameter thereof,
   (b) a toothed body mounted within said cylindrical casing and having the teeth thereof complementally engageable with the teeth of said cylindrical casing, which toothed body is non-rotatable with respect to said cylindrical casing,
       (1) at least one clutch wear plate, having a friction surface, mounted on said toothed body for limited planar movement about a peripheral pivot point with respect thereto,
       (2) said toothed body having fluid passages formed therein, which passages are in communication with said wear plate,
   (c) a friction drive plate, having a face complementary to the friction face of said wear plate, which friction drive plate is selectively engageable therewith, mounted within said housing for rotation about an axis, the axis of which drive plate is substantially coaxial with the axis of said cylindrical casing,
       (1) said friction drive plate having teeth formed internally thereof,
       (2) a toothed member complementally engaging said teeth in said friction drive plate to form a driving connection therewith upon relative rotation between said friction drive plate and said cylindrical casing.

2. A wear plate assembly as defined in claim 1; wherein
(a) a plurality of toothed bodies are mounted within said cylindrical casing, which toothed bodies are non-rotatable with respect to said cylindrical casing, and
(b) a plurality of clutch wear plates, each having a friction surface, one of which clutch wear plates is mounted on each said toothed body for limited planar movement about the peripheral pivot point with respect thereto,
(c) each said toothed body having fluid passages formed therein, which fluid passages are in communication with said respective wear plates.

3. A wear plate assembly as defined in claim 1; wherein
(a) said toothed body has a circular recess formed therein,
(b) said wear plate being of a diameter less than the diameter of said circular recess and being fitted therein,
(c) an abutment formed within said circular recess near the periphery thereof,
 (1) said wear plate having a notch formed therein to complementally engage said abutment to enable limited pivotal movement of said wear plate about said abutment to frictionally impinge the periphery of said wear plate in frictional engagement with the shoulder of said circular recess to transmit torque in excess of the shear strength of said abutment.

4. A wear plate assembly as defined in claim 3; wherein
(a) a retainer ring is fitted within said circular recess in fixed relation, and extends over said wear plate to maintain said wear plate against axial movement with respect to said toothed body to enable said wear plate to expand and contract without distortion thereof.

5. A wear plate assembly for use with an axially engageable brake or clutch, which assembly comprises;
(a) a body,
 (1) said body having an annular recess formed therein,
 (2) an annular wear plate fitted within said annular recess within said body, which wear plate is fixed against axial movement with respect thereto,
 (3) said body defining an inner generally cylindrical surface and an outer generally cylindrical surface spaced from one another to define said annular recess therebetween, the inner peripheral edge of said wear plate being of greater diameter than the outer diameter of said inner surface of the body to define a space therebetween, the outer peripheral edge of said wear plate being of less diameter than the inner diameter of said outer surface of the body to define a space therebetween and permit relative movement of said wear plate with respect to the body, and
 (4) interengageable means on said body and said wear plate providing a pivotal connection therebetween to allow limited pivotal movement of said wear plate relative to said body in a plane extending substantially perpendicular to the longitudinal axis of said body whereby a peripheral edge of said plate is adapted to contact the adjacent surface of the body.

6. A wear plate assembly for use with an axially engageable brake or clutch, as defined in claim 5 wherein
(a) said body has fluid passages formed therein, which fluid passages are in communication with said wear plate,
 (1) sealing means cooperatively fitted intermediate said body and the inner face of said wear plate to form a fluid seal therebetween, and
 (2) conduit means associated with said body and in communication with said fluid passages to enable a coolant fluid to be circulated therethrough.

7. A wear plate assembly for use in an axially engageable brake or clutch, as defined in claim 6; wherein
(a) said fluid sealing means comprises a pair of O-rings associated with said body and said wear plate, with the outer O-ring being spaced inwardly from the outer periphery of said wear plate and the inner O-ring being spaced outwardly from the inner diameter of said wear plate.

8. A wear plate assembly for use with an axially engageable brake or clutch, as defined in claim 6; wherein
(a) said body has a pair of O-ring grooves formed therein, one a spaced distance inward from the outer periphery of said body and the other a spaced distance outward from the inner diameter of said body,
(b) an O-ring fitted within each said groove to form a portion of said fluid seal, said wear plate being fitted on said O-rings,
(c) said body having a groove formed therein peripherally of said annular recess,
(d) a retainer ring fitted within said recess in said groove, the width of which groove is less than the composite cross sectional dimension of said O-ring, said wear plate and the thickness of said retainer ring, so as to exert a compressive strain on said O-ring and said wear plate.

9. A wear plate assembly for use with an axially engageable brake or clutch, as defined in claim 5; wherein
(a) said interengageable means includes a pin fixedly mounted on said body near the outer periphery of said wear plate, said wear plate having at least one notch formed in the periphery thereof for engaging said pin.

10. A wear plate assembly for use with an axially engageable brake or clutch, as defined in claim 9; wherein
(a) said pin is round and is utilized as a pivot pin, so that when said body and said wear plate are relatively rotated, the round pin will serve as a locking member which develop a compressive force to move said wear plate to the opposite side of said annular recess to create sufficient frictional force on the periphery of said wear plate to maintain said wear plate against relative rotation upon engaging a friction member with said wear plate.

11. A wear plate assembly for use with an axially engageable brake or clutch, as defined in claim 5; wherein
(a) said interengageable means includes two spaced pins mounted on said body near the outer periphery of the annular recess therein, said pins being spaced not more than 45 degrees apart,
 (1) said wear plate having two notches formed in the periphery thereof for engaging said pins.

References Cited

UNITED STATES PATENTS

| 2,774,453 | 12/1956 | Wilson. | |
| 2,778,451 | 1/1957 | Friedman. | |
| 3,295,641 | 1/1967 | Eaton et al. | |
| 1,538,029 | 5/1925 | Detlaff | 192—70.18 |
| 2,567,125 | 9/1951 | Ruch | 192—55 |
| 2,143,300 | 1/1939 | Cole | 192—55 XR |
| 3,236,347 | 2/1966 | Puls et al. | 192—70.16 XR |

BENJAMIN W. WYCHE III, *Primary Examiner.*

U.S. Cl. X.R.

188—218, 264; 192—88, 70.16, 107